United States Patent
Ide et al.

(10) Patent No.: US 7,711,260 B2
(45) Date of Patent: May 4, 2010

(54) DIGITAL CAMERA AND CAMERA SYSTEM

(75) Inventors: Masataka Ide, Hachioji (JP); Hisayuki Matsumoto, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 234 days.

(21) Appl. No.: 11/801,371

(22) Filed: May 9, 2007

(65) Prior Publication Data

US 2007/0269197 A1 Nov. 22, 2007

(30) Foreign Application Priority Data

May 16, 2006 (JP) .............................. 2006-136668

(51) Int. Cl.
| | |
|---|---|
| G03B 3/00 | (2006.01) |
| G03B 17/00 | (2006.01) |
| G03B 13/00 | (2006.01) |
| H04N 5/232 | (2006.01) |
| G02B 7/04 | (2006.01) |
| G02B 27/40 | (2006.01) |

(52) U.S. Cl. ........................... 396/91; 396/82; 396/104; 396/128; 348/353; 348/355; 348/356; 250/201.7; 250/201.8

(58) Field of Classification Search .................. 396/91, 396/89, 104, 125, 72, 77, 79–82, 111, 119, 396/126–128; 348/345, 350, 353–356, 335; 250/201.1, 201.2, 201.4, 201.6, 201.7, 201.8
See application file for complete search history.

(56) References Cited

U.S. PATENT DOCUMENTS

2004/0057713 A1* 3/2004 Ishikawa et al. .............. 396/89

FOREIGN PATENT DOCUMENTS

| JP | 07-043605 | 2/1995 |
|---|---|---|
| JP | 2003-29135 | 1/2003 |
| JP | 2003-043344 | 2/2003 |
| JP | 2003-302571 | 10/2003 |

OTHER PUBLICATIONS

First Notification of Office Action for Chinese Patent Application No. 20071013815.2, mailed Nov. 28, 2008 (7 pgs.) with translation (10 pgs.).

* cited by examiner

*Primary Examiner*—Rochelle-Ann J Blackman
(74) *Attorney, Agent, or Firm*—Straub & Pokotylo; John C. Pokotylo

(57) ABSTRACT

There is disclosed a digital camera which detects a focus of a lens unit by a method selected from a plurality of focus detection methods based on information on the lens unit taken from the lens unit attached to the digital camera. As an example of a focus detection method, there is a method by a phase difference system or a contrast system, but the method is not limited to this example.

10 Claims, 13 Drawing Sheets

FIG. 9

| LENS TYPE DATA | CONTENTS |
|---|---|
| 0 | EXCLUSIVE USE FOR PHASE DIFFERENCE AF |
| 1 | EXCLUSIVE USE FOR IMAGER AF |
| 2 | BOTH ARE POSSIBLE |

FIG.15

| LENS DRIVING SOURCE DATA | CONTENTS |
|---|---|
| 0 | DC MOTOR |
| 1 | STEPPING MOTOR |
| 2 | ULTRASONIC MOTOR |

DIGITAL CAMERA AND CAMERA SYSTEM

CROSS-REFERENCE TO RELATED APPLICATION

This application is based upon and claims the benefit of priority from prior Japanese Patent Application No. 2006-136668, filed on May 16, 2006, the entire contents of which are incorporated herein by reference.

BACKGROUND OF THE INVENTION

1. Field of the Invention

The present invention relates to a digital camera and a camera system having an automatic focusing (AF) control function.

2. Description of the Related Art

Heretofore, as an AF mechanism disposed in a single-lens reflex camera using a film and a single-lens reflex digital camera, a through-the-lens (TTL) phase-difference AF mechanism has been frequently used. In this case, a defocus detection mechanism which performs the TTL phase-difference AF is disposed in a main body of the single-lens reflex camera. Moreover, a focusing lens disposed in a lens barrel of an interchangeable lens which is detachably attached to the single-lens reflex cameras is driven by a motor disposed in the lens barrel of the interchangeable lens or the main body of the single-lens reflex camera to perform a focusing control operation. It is to be noted that the TTL phase-difference AF is sometimes referred to simply as the phase-difference AF.

On the other hand, in a compact digital camera, a camcorder or the like, so-called imager AF is frequently performed which is AF of such a system that contrast is detected with a high frequency component of a signal of an image pickup device. Here, the imager AF is an auto focusing method where an evaluated focal value of a focus lens at each focus lens position is calculated while moving the focus lens at a predetermined driving amount interval, and the focus lens position where the evaluated focal value reaches a peak value is obtained.

It is to be noted that the TTL phase-difference AF and the imager AF have the following characteristics, respectively.

The TTL phase-difference AF is the AF at a speed higher than that of the imager AF.

The imager AF is the AF having a precision higher than that of the TTL phase-difference AF.

Based on such characteristics, the TTL phase-difference AF and the imager AF are selectively used in accordance with an application. Here, as a technology in selectively using the TTL phase-difference AF and the imager AF, for example, the following technology is known.

In Japanese Patent Application Laid-Open No. 7-43605, an automatic focusing device is disclosed in which the TTL phase-difference AF is combined with the imager AF to perform focusing control. Specifically, in this automatic focusing device, after coarse control is performed by the TTL phase-difference AF, fine control is performed by the imager AF.

Moreover, in Japanese Patent Application Laid-Open No. 2003-302571, an automatic focusing control device is also disclosed in which after the coarse control is performed by the TTL phase-difference AF, the fine control is performed by the imager AF in the same manner as in the automatic focusing device disclosed in Japanese Patent Application Laid-Open No. 7-43605. However, in this automatic focusing control device disclosed in Japanese Patent Application Laid-Open No. 2003-302571, to speed us the focusing, the TTL phase-difference AF is selected in preference to the imager AF, when it is decided that the focusing is possible with the TTL phase-difference AF alone.

In addition, for a lens-interchangeable single-lens reflex camera using a film, many interchangeable lenses are on sale and already spread widely. Here, many of the interchangeable lenses which have already spread are designed to perform the TTL phase-difference AF. That is, focusing control mechanisms and the like of the focus lenses disposed in the lens barrels of many interchangeable lenses are designed as a system which drives the lens by a driving amount corresponding to a detected defocus amount. Specifically, as a driving source for the focusing control in the interchangeable lens barrel, a direct-current motor (a DC motor) is employed in many cases. On the other hand, as the driving source of the focus lens in the imager AF, a stepping motor is optimum. In actual, stepping motors are employed in many cases of the imager AF.

BRIEF SUMMARY OF THE INVENTION

The present invention relates to detecting a focus of a lens unit by a method selected from a plurality of focus detection methods based on information on the lens unit taken into a digital camera from the lens unit, which is attached to the digital camera.

Next, one example of a structure of the present invention will be described. A digital camera to which a lens unit having a focus lens as a shooting optical system is detachably attached, comprising: an imaging section having an image pickup device to convert an optical image of a subject which has struck via the lens unit into an electrical signal; a first focus detecting section which detects focal information of the focus lens by a first focus detection method; a second focus detecting section which detects focal information of the focus lens by a second focus detection method; a control section which selects the focal information detected by at least one of the first focus detecting section and the second focus detecting section and which generates a focusing control signal to control a focal position of the focus lens based on the selected focal information; and a transmitting and receiving section which transmits the focusing control signal to the lens unit and which receives information on the lens unit transmitted from the lens unit, wherein the control section selects the focal information based on the information on the lens unit acquired via the transmitting and receiving section.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 9 is a diagram showing a lens type correspondence table;

FIG. 15 is a diagram showing driving source data for judgment of a driving source.

DETAILED DESCRIPTION OF THE PREFERRED EMBODIMENT

Preferred embodiments of the invention are described below with reference to the accompanying drawings.

First Embodiment

Figure 1:
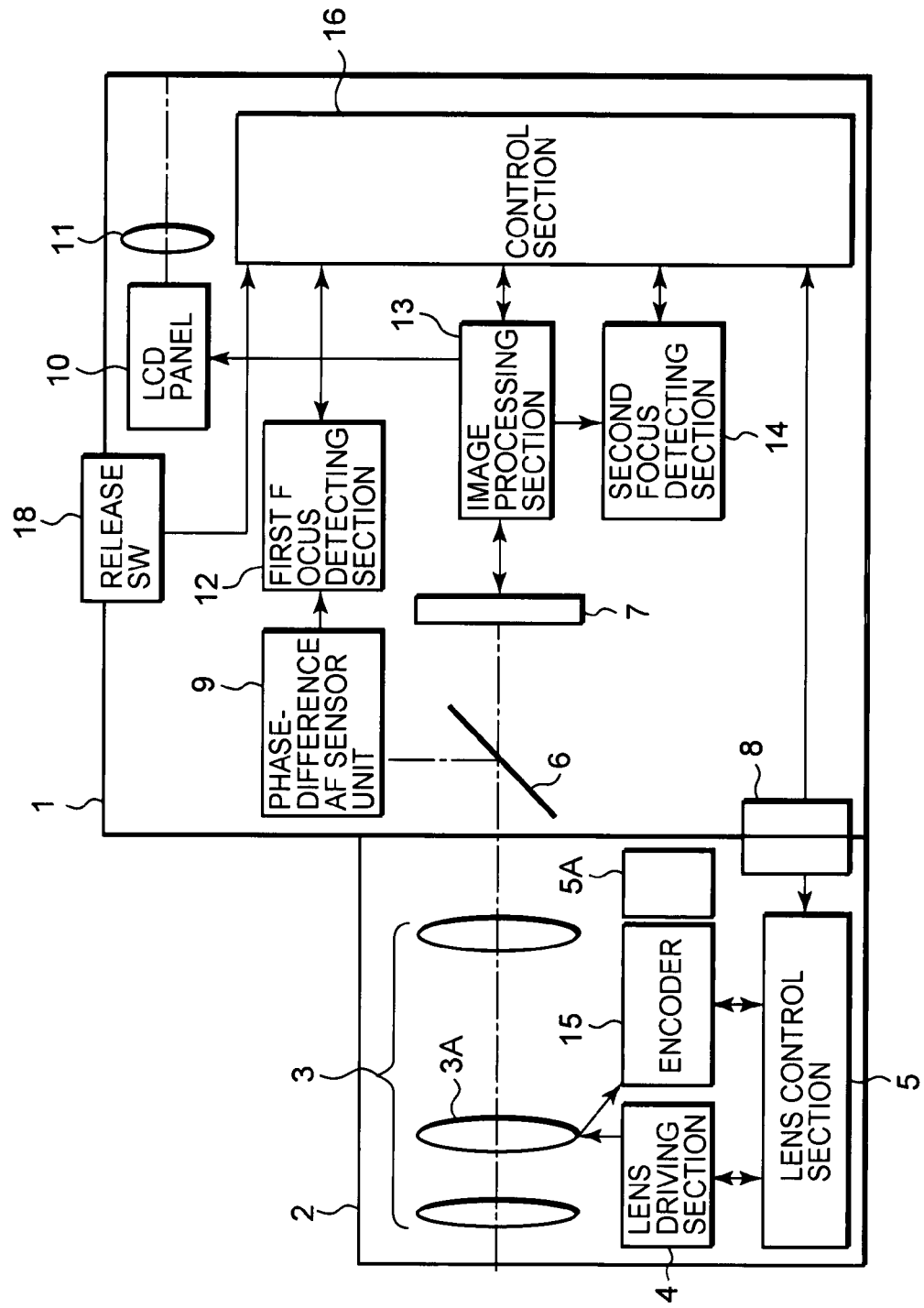
FIG. 1 is a diagram showing a system structure of a digital camera according to a first embodiment of the present invention.

A digital camera and a camera system according to a first embodiment of the present invention will hereinafter be described with reference to the drawings. FIG. 1 is a diagram showing a system structure of the digital camera according to the first embodiment of the present invention. It is to be noted that in the first embodiment, a single-lens reflex digital camera is assumed as the digital camera and described.

First, in FIG. 1, reference numeral 1 is a camera body. Reference numeral 2 is an interchangeable lens as a lens unit.

Here, the interchangeable lens 2 has a photographing lens system 3, a lens driving section 4, a lens control section 5, an encoder 15 and a storage section 5A.

The photographing lens system 3 includes a focus lens 3A. Moreover, during focusing control, the focus lens 3A is moved to control a focus. The lens driving section 4 is a section which moves the focus lens 3A in an optical axis direction. The lens control section 5 is a communicating section which communicates with the camera body 1 as well as a control section which controls the lens driving section 4. The encoder 15 is an encoder which generates a pulse signal in response to movement of the focus lens 3A and which outputs the pulse signal to the lens control section 5. Information including a lens type and a characteristic of the lens.

It is to be noted that the lens control section 5 counts output pulses of the encoder 15 to recognize a position of the focus lens 3A.

On the other hand, the camera body 1 has a half mirror 6, an image pickup device (imaging section) 7, a phase-difference AF sensor unit 9, an LCD panel 10, a finder optical system 11, a first focus detecting section 12, an image processing section 13, a second focus detecting section 14, a control section 16 and a release switch 18.

The half mirror 6 is a member which divides a shot luminous flux into a luminous flux to the image pickup device 7 and a luminous flux to the phase-difference AF sensor unit 9. According to such a structure, an image pickup operation and an operation for phase-difference AF can simultaneously be performed. The LCD panel 10 is an LCD panel for an electronic view finder in which a backlight is incorporated. The finder optical system 11 is a member for a user to observe the LCD panel 10. The first focus detecting section 12 is a member which calculates a defocus amount or the like from an output of the phase-difference AF sensor unit 9.

The image processing section 13 subjects a picture signal output from the image pickup device 7 to white balance adjustment, luminance processing, color matrix processing and the like, and forms image data as a shot image and image data for a finder. in addition to the formation of the image data, the image processing section 13 acquires processes a signal output from the image pickup device 7 to acquire image information.

The image data for the finder formed by the image processing section 13 is sent to the LCD panel 10, and displayed in the LCD panel 10. Moreover, the image data for the finder is observed by the user via the finder optical system 11. The image data as the shot image is stored in a nonvolatile memory (not shown) or the like.

Furthermore, the image processing section 13 generates a driving control signal of the image pickup device 7 based on a reference clock (not shown) sent from the control section 16 described later. Specifically, the image processing section 13 generates a timing signal of start/end (start/end of exposure) of integration of the image pickup device 7 and a clock signal such as a readout control signal (a horizontal sync signal, a vertical sync signal VD, a transfer signal or the like) of a light receiving signal of each pixel and the like, and outputs the signals to the image pickup device 7.

Here, the image processing section 13 outputs the vertical sync signal VD to the second focus detecting section 14, the control section 16 and the lens control section 5. It is to be noted that a signal VDP which agrees with the vertical sync signal VD is output to the lens control section 5 via a lens contact section (a transmitting and receiving section) 8. The lens contact section 8 is a lens contact to which the control section 16 disposed in the camera body 1, a communication line with the lens control section 5 disposed in the interchangeable lens 2 and the like are connected. It is to be noted that the lens contact section 8 has a plurality of contacts required for connection of a plurality of power sources including a lens power source to be supplied from the camera body 1 to the interchangeable lens 2 and transmission of a plurality of signals including the vertical sync signal.

The second focus detecting section 14 is a member which judges a magnitude of change of a luminance signal obtained from the image processing section 13 to calculate an evaluated AF value indicating a degree of focusing. It is to be noted that a focus detection area which is an area to calculate the evaluated AF value is predetermined as a region which agrees with the focus detection area during the phase difference detection. The control section 16 is a member which controls the whole camera body 1 and interchangeable lens 2.

It is to be noted that in the camera according to the first embodiment, a release button (not shown) is a two-stage type button to be pressed. When the button is pressed halfway, a first release switch (hereinafter referred to as 1RSW) is turned on, and a focus detecting operation is performed described later. When the release button (not shown) is fully pressed, a second release switch (hereinafter referred to as 2RSW) is turned on, and a shooting operation is performed as described later. Here, the 1RSW corresponds to the release switch 18.

First, imager AF (AF using a focus detection method performed by a contrast system) will be described with reference to FIGS. 2 and 3.

Figure 2:
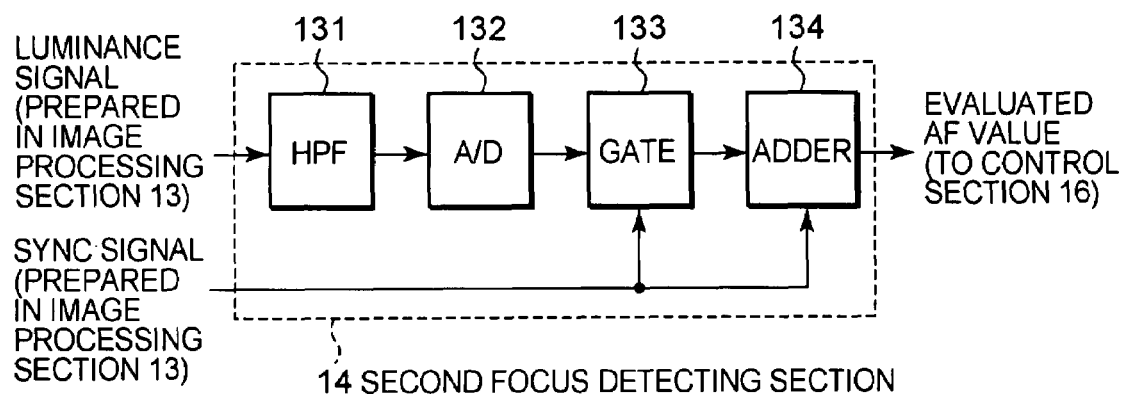
FIG. 2 is a diagram showing an internal structure of a second focus detecting section.
Figure 3:
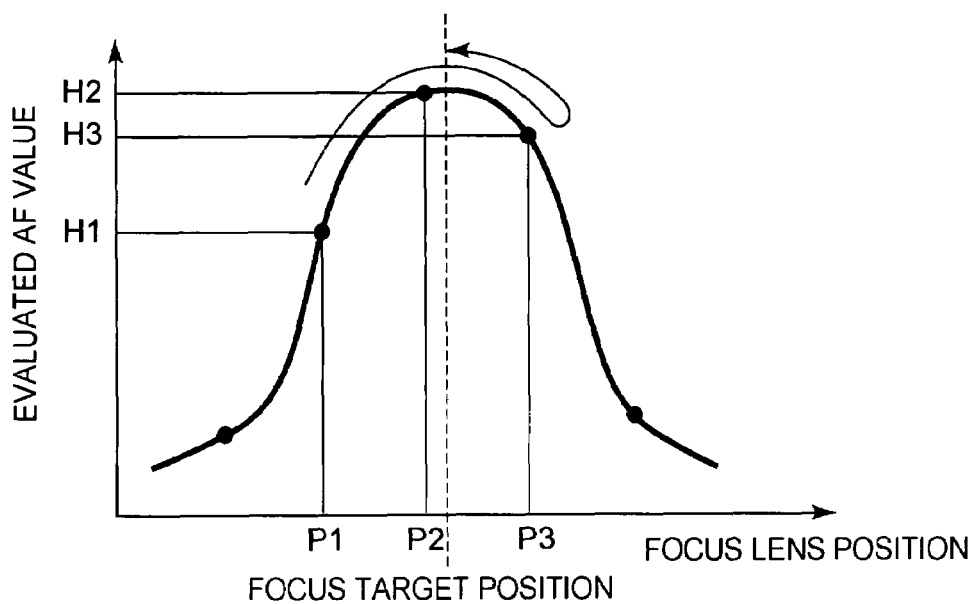
FIG. 3 is a graph of an evaluated AF value to a focus lens position.

First, as shown in FIG. 2, in the second focus detecting section 14, a high pass filter (HPF) 131, an A/D converter 132, a focus detection area selection gate 133 and an adder 134 are connected in this order. Here, each section component member disposed in the second focus detecting section 14 is a circuit block to obtain the evaluated AF value.

The image processing section 13 inputs the luminance signal generated from an output signal of the image pickup device 7 into the HPF 131 of the second focus detecting section 14. Moreover, this luminance signal is processed as follows in the image processing section 13.

First, high frequency components included in the luminance signal are extracted from the luminance signal by the HPF 131. When sharpness of an image is high, a larger amount of the extracted high frequency components are extracted. Therefore, the high frequency components of a predetermined image range can be integrated to obtain a numeric value of an average degree of the image sharpness in the image range.

Next, the high frequency component passed through the HPF 131 is converted into a digital signal by the A/D converter 132, and input into the focus detection area selection gate 133. This focus detection area selection gate 133 is a circuit which extracts only signals corresponding to a plurality of focus detection areas of an imaging screen. Therefore, the focus detection area selection gate 133 extracts only information on a subject, reflected in the focus detection area corresponds to the predetermined image range for the integration.

Here, as the focus detection area, a focus detection area selected based on a predetermined selection algorithm (e.g., a closest selection algorithm) may be employed. Needless to say, a focus detection area selected from the plurality of focus detection areas by the user may be employed.

Moreover, the digital signal extracted by the focus detection area selection gate 133 is input into the adder 134. Furthermore, the digital signals of a portion of the focus detection area of one frame are integrated. It is to be noted that a value integrated by this adder 134 is input as the evaluated AF value indicating the sharpness of the image into the control section 16. The control section 16 can perform the imager AF which is auto focusing of a known mountain climbing system by use of the evaluated AF value calculated as described above.

It is to be noted that the image processing section 13 outputs the luminance signal to the second focus detecting section 14, and outputs the sync signal to the focus detection area selection gate 133, the adder 134 and the control section 16 in response to the picture signal.

Here, to perform the imager AF, the control section 16 moves the focus lens 3A by the lens driving section 4 via the lens control section 5. Moreover, position information of the focus lens 3A from an output of the encoder 15. Furthermore, the evaluated AF value is input from the adder 134. As shown in FIG. 3, the evaluated AF value of the position of the focus lens 3A is obtained as evaluated AF coordinate values ((P1, H1), (P2, H2) and (P3, H3)).

Moreover, the control section 16 calculates a lens position of the focus lens 3A at a time when the evaluated AF value reaches a maximum value, that is, a peak value by interpolation using the above evaluated AF coordinate value. Subsequently, the focus lens 3A is moved to a focus target position PM which is the lens position at the time when the evaluated AF value reaches the peak value.

Next, TTL phase-difference AF will be described.

Figure 4:
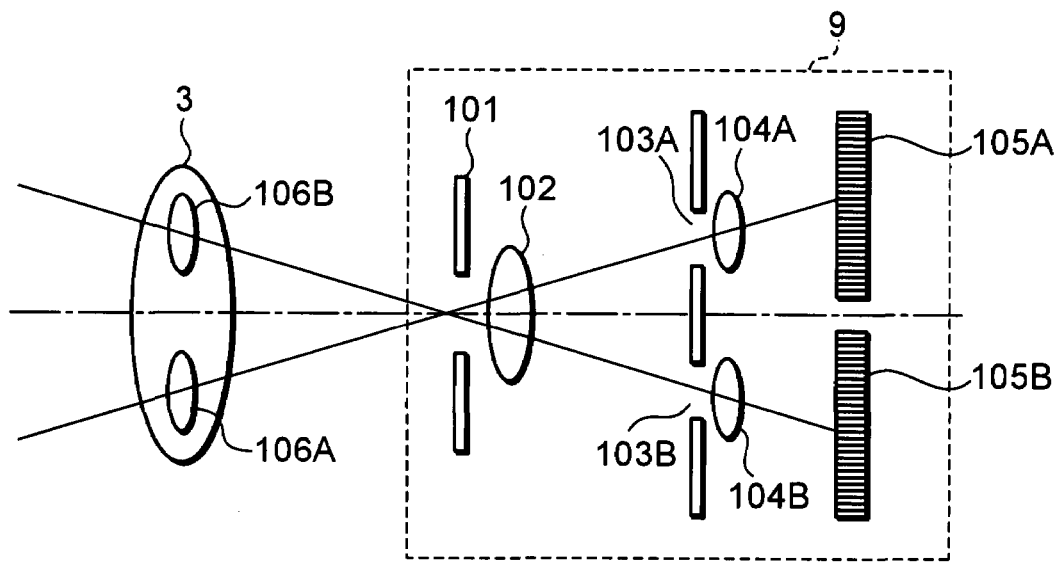
FIG. 4 is a diagram showing a structure of a phase-difference AF sensor unit.

First, as shown by a broken line of FIG. 4, the phase-difference AF sensor unit 9 has a view field mask 101, a condenser lens 102, aperture masks 103A and 103B, secondary optical systems 104A and 104B and photoelectric conversion element rows 105A and 105B.

As shown in FIG. 4, the view field mask 101 is disposed in the vicinity of a scheduled imaging surface on which a subject image is formed by the photographing lens system 3. Furthermore, the condenser lens 102 is disposed in the vicinity of the view field mask 101. In addition, the aperture masks 103A and 103B are aperture masks with openings, and arranged behind the condenser lens 102 along an optical path of the condenser lens. Moreover, the secondary optical systems 104A and 104B include secondary imaging lenses, and arranged behind the aperture masks 103A and 103B along the optical path. The photoelectric conversion element rows 105A and 105B are arranged behind the secondary imaging lenses along the optical path. It is to be noted that, as shown in FIG. 4, the photographing lens system 3 can define two different pupil areas 106A and 106B.

According to such a structure, two subject images formed by the luminous fluxes passed through the pupil areas 106A and 106B of the photographing lens system 3 are formed on the photoelectric conversion element rows 105A and 105B, respectively. The focus is detected using a fact that a relative positional relation between two subject images formed again in this manner changes with a focused state of the photographing lens system 3. It is to be noted that a phase difference which is this relative positional relation between the two subject images can be calculated by obtaining correlation between the positions. A concept of this calculation will hereinafter be described with reference to FIG. 5.

Figure 5:
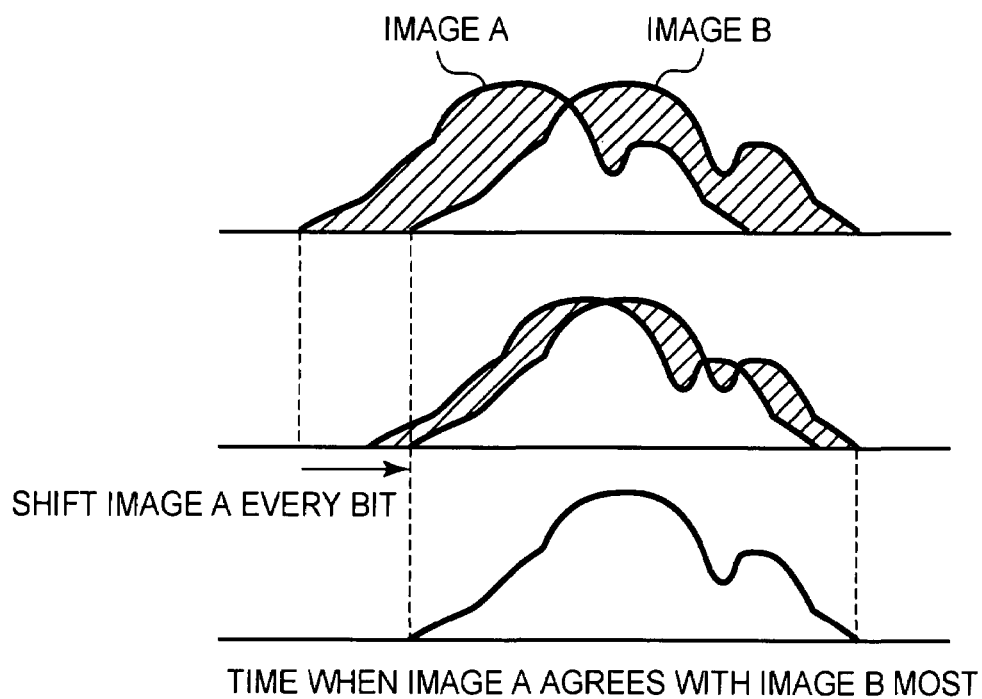
FIG. 5 is a diagram showing a concept to calculate a phase difference which is a relative positional relation between two subject images.

That is, an area S (a sum of absolute values of differences of outputs between the corresponding pixels of images A and B) of a region where two subject images (the images A and B) are not superimposed on each other is assumed as hatched in FIG. 5. Moreover, one image (the image A of the present example) is shifted every pixel (one bit) of the photoelectric conversion element to obtain a minimum value of the area S.

Here, when the image A agrees with the image B, the area S naturally has the minimum value. Moreover, a defocus amount of one image (the image A of the present example) required for bringing about this minimum value is the phase difference which is a relative defocus amount. As described above, assuming that an interval between gravity centers of the two pupil areas 106A and 106B is a base line length during triangle measurement, a defocus amount of the photographing lens system 3 can be obtained based on the phase difference which is the relative defocus amount along the photoelectric conversion element rows 105A and 105B.

Figure 6:
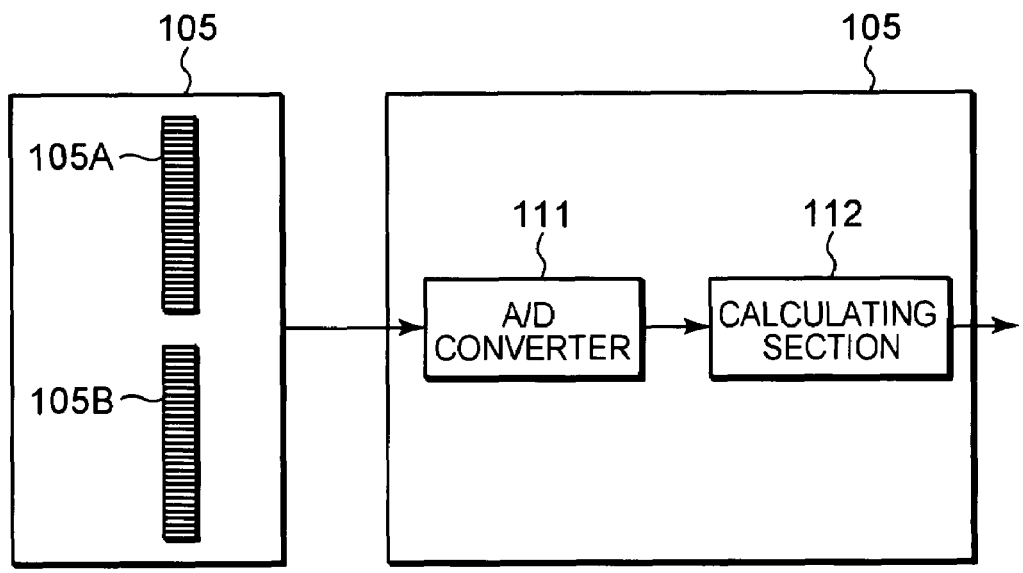
FIG. 6 is a diagram mainly showing a component concerning TTL phase-difference AF in the digital camera according to a first embodiment of the present invention.

FIG. 6 is a drawing mainly showing an extracted component concerning the TTL phase-difference AF in the digital camera according to the first embodiment. Here, the photoelectric conversion element rows 105A and 105B are included in the phase-difference AF sensor unit 9. An A/D converter 111 is included in the first focus detecting section 12. Analog outputs from the pixels of the photoelectric conversion element rows 105A and 105B are converted into digital signals by the A/D converter 111. Furthermore, a calculation processing section 112 such as a microcomputer is incorporated in the first focus detecting section 12. According to the above structure, the phase difference between the two images (the images A and B) is obtained, and the focus lens 3A is controlled based on this phase difference. This will hereinafter be described specifically.

First, it is assumed that output values of the photoelectric conversion element row 105A which have been A/D converted by the A/D converter 111 are L(1), L(2), ..., L(n) and that output values of the photoelectric conversion element row 105B which have been A/D converted by the A/D converter 111 are R(1), R(2), ..., R(n). Here, 1 to n correspond to the photoelectric conversion elements, and are represented by variables i.

Here, a correlation function F(i) indicating an agreement degree of the image with respect to the relative defocus amount (the phase difference) of two images represented by the phase difference=i·p (p is a pixel pitch) is given by, for example, Equation (1).

$$F(i) = \sum_j |L(j) - R(j+1)| \quad (1)$$

If two images of the photoelectric conversion element rows 105A and 105B relatively defocus at a pitch of k pixels, F(k)=0 results from Equation (1). However, owing to an influence of a pixel noise or the like, a form of an image signal of the photoelectric conversion element row 105A is not completely the same as that of an image signal of the photoelectric conversion element row 105B. Therefore, F(k)>0 usually results.

Figure 7:
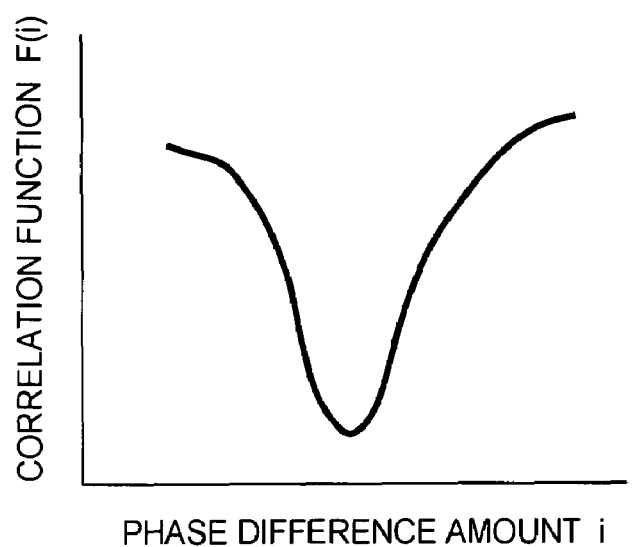
FIG. 7 is a graph showing one example of a relation between i and F(i)

FIG. 7 shows one example of the above relation between i and F(i). As described above, (i, F(i)) is actually discrete data, but FIG. 7 shows a continuous graph for the sake of convenience. It is to be noted that after obtaining the minimum value of F(i) in a predetermined range of i, the interpolation is performed using correlation function values before and after the minimum value in order to perform highly precise detection.

Figure 8:
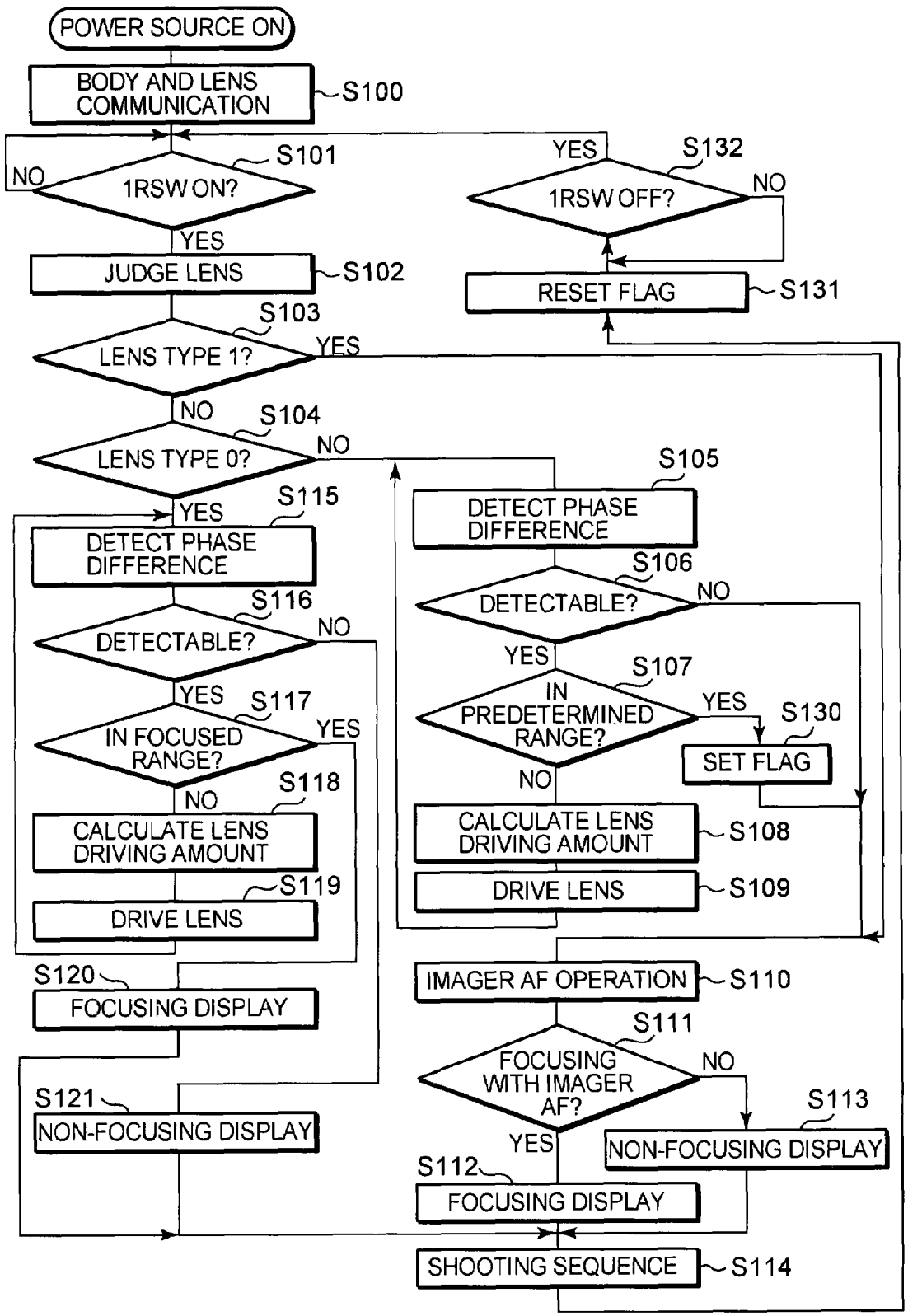
FIG. 8 is a flow chart showing operation control performed by a control section of the digital camera according to the first embodiment of the present invention.

The operation control performed by the control section 16 of the digital camera according to the first embodiment will hereinafter be described with reference to a flow chart of FIG. 8.

First, when the user turns on the power source (not shown) disposed in the camera body 1, the control section 16 of the camera body 1 communicates with the lens control section 5 of the interchangeable lens 2 (step S100). Specifically, in this step S100, the control section 16 reads out various data concerning this lens stored in the storage section 5A of the interchangeable lens 2, and stores the data in a storage section (not shown) of the control section 16.

It is to be noted that communication between the control section 16 of the camera body 1 and the lens control section 5 of the interchangeable lens 2 will hereinafter be referred to as body and lens communication. Examples of the data concerning the interchangeable lens 2 to be communicated during this body and lens communication include information such as the lens type of the interchangeable lens 2, a focal length, a shootable distance, a movable range of the focus lens, the total number of focus pulses corresponding to the whole region of a shooting distance, a motor type and various corrected values concerning the AF.

Subsequently, the user half presses the release button to wait until the release switch 18 (the 1RSW) is turned on (step S101). Moreover, when the 1RSW is turned on, the step S101 is branched to YES to start a focusing operation by the auto focusing.

First, the lens type of the interchangeable lens 2 is judged (step S102). Specifically, during the judgment of the lens type in this step S102, with reference to the lens type data acquired by the body and lens communication in the step S100, the lens type of the interchangeable lens 2 is judged based on a lens type correspondence table shown in FIG. 9. Here, the lens type correspondence table is a table in which three lens type data (0, 1 and 2) are associated with AF aptitudes of the lens type data.

It is to be noted that the lens type 0 indicates that the interchangeable lens deals with the only phase-difference AF. The lens type 1 indicates that the interchangeable lens deals with the only imager AF. Furthermore, the lens type 2 indicates that the interchangeable lens deals with both of the phase-difference AF and the imager AF.

After ending the processing of the step S102, it is judged whether or not the lens type of the interchangeable lens 2 is the lens type 1 (step S103). In a case where it is judged in the step S103 that the interchangeable lens 2 is the lens type 1, the processing shifts to the step S110 described later. On the other hand, in a case where it is judged in the step S103 that the interchangeable lens 2 is not the lens type 1, it is judged whether or not the interchangeable lens 2 is the lens type 0 (step S104). In a case where it is judged in this step S104 that the interchangeable lens 2 is the lens type 0, the processing shifts to step S115 described later.

In a case where it is judged in the step S104 that the interchangeable lens 2 is not the lens type 0 (in a case where the interchangeable lens 2 is the lens type 2), the phase difference is detected (step S105). During the detection of the phase difference in this step S105, the first focus detecting section 12 acquires a signal from the phase-difference AF sensor unit 9, and calculates the defocus amount. In the step S105, it is evaluated whether or not the phase difference can be detected, and reliability of the phase difference detection is also calculated.

Subsequently, it is judged whether or not a highly reliable defocus amount has been obtained during the phase difference detection in the step S105. In other words, it is judged whether or not the phase difference can be detected (step S106). In a case where it is judged in this step S106 that the phase difference can be detected, it is judged whether or not the defocus amount detected in the step S105 is in a predetermined range described later (step S107). It is to be noted that this predetermined range is a range predetermined by assuming that the focusing operation can be performed sufficiently highly precisely at a high speed by the imager AF in a case where the defocus amount is in the above range.

In a case where it is judged in the step S107 that the defocus amount is in the predetermined range, an in-range flag indicating this effect is set (step S130). Furthermore, the processing shifts to step S110 described later.

In addition, in a case where it is judged in the step S107 that the defocus amount is not in the above predetermined range, a lens driving amount and a driving direction of the focus lens 3A required for obtaining the focused state are calculated from the obtained defocus amount (step S108). Moreover, the focus lens 3A is driven based on the lens driving amount and the driving direction calculated in the step S108 (step S109).

Specifically, in the step S109, the lens driving amount and the driving direction calculated in the step S108 are transmitted as a phase-difference AF lens driving command to the lens control section 5 of the interchangeable lens 2 via the lens contact section 8. Moreover, the lens control section 5 controls the lens driving section 4 to drive the focus lens 3A. After ending the processing of the step S109, the processing returns to the step S105. In a case where conditions of the steps S106 and S107 are not satisfied in this manner, the focus of the focus lens 3A is firstly coarsely adjusted by the phase-difference AF. Subsequently, the above conditions are checked again.

In addition, in a case where it is judged in the step S106 that the phase difference cannot be detected, and after it is judged in the step S107 that the defocus amount is in the predetermined range to end the processing of the step S130, the imager AF is executed (step S110). Specific processing contents of this imager AF will be described later in detail with reference to a flow chart of FIG. 10. After ending the processing of the imager AF in the step S119, it is judged from the result of the imager AF whether or not the focused state has been obtained (step S111).

In a case where it is judged in the step S111 that the focused state can be obtained, focusing display indicating that the focused state has been obtained is displayed in the LCD panel 10 by the image processing section 13 (step S112). On the other hand, in a case where it is judged in the step S111 that the focused state is not obtained, the image processing section 13 displays, in the LCD panel 10, that the focused state is not obtained (step S113).

Moreover, after ending the processing of the step S112 or the S113, the user fully presses the release button to instruct the shooting, and the shooting is performed based on a usual shooting sequence (step S114).

After ending the processing of the step S114, the in-range flag is reset in a case where the in-range flag is set in the step S139 (step S131). Moreover, the step waits until the release switch 18, that is, the 1RSW turns off (step S132). In a case where it is judged in this step S132 that the 1RSW turns off, the processing returns to the step S101.

In addition, in a case where it is judged in the step S104 that the interchangeable lens 2 is the lens type 0, the phase difference is detected (step S115). Specifically, in this step S115, the defocus amount is calculated by the first focus detecting section 12 based on the signal output from the phase-difference AF sensor unit 9. It is evaluated whether or not the phase difference can be detected, and the reliability of the detection is calculated.

Subsequently, it is judged whether or not the highly reliable defocus amount has been obtained during the phase difference detection of the step S115 (step S116). In a case where it is judged in this step S116 that the phase difference can be detected, it is judged whether or not the detected current defocus amount is in a focused range (step S117). Here, the focused range indicates a numeric value predetermined by assuming that the focused state is obtained in a case where the defocus amount is in this range. In a case where it is judged in this step S117 that the current defocus amount is not in the focused range, the driving amount and the driving direction of the focus lens 3A required for obtaining the focused state are calculated based on the defocus amount (step S118).

Moreover, the focus lens 3A is driven based on the driving amount and the driving direction of the focus lens 3A calculated in the step S118 (step S119). Specifically, the lens driving amount and the driving direction calculated in the step S118 are transmitted as the phase-difference AF lens driving command to the lens control section 5 of the interchangeable lens 2. Moreover, the lens control section 5 controls the lens driving section 4 to drive the focus lens 3A. Subsequently, the processing returns to the step S115.

In addition, in a case where it is judged in the step S116 that the phase difference cannot be detected, the image processing section 13 displays, in the LCD panel 10, that the focused state is not obtained (step S121). In a case where it is judged in the step S117 that the current defocus amount is in the focused range, the focused display indicating that the focused state is obtained is displayed in the LCD panel 10 by the image processing section 13 (step S120). Moreover, after ending the processing of this step S120 or S121, the processing shifts to the shooting sequence of the step S114.

As described above, in the digital camera according to the first embodiment, when the interchangeable lens 2 is the lens type 0, the only phase-difference AF is executed. When the interchangeable lens 2 is the lens type 1, the only imager AF is executed. Moreover, in a case where the interchangeable lens 2 is the lens type 2, after coarsely adjusting the focusing control by the phase-difference AF, the focusing control is finely adjusted by the imager AF.

Here, a relation between the lens type of the interchangeable lens 2 and time required for the focusing control will be described. First, when the user performs the imager AF without feeling any incompatibility, the time required for the focusing control needs to be shortened to a certain degree (set to, e.g., one second or less). This is because, in a case where the time required for the focusing control is excessively long, a problem occurs that the opportunity to get the best shot is missed or that a camera user judges that the camera gets out of order.

Therefore, when the driving time of the focus lens 3A is longer than a predetermined time, it is considered that the lens is not suitable for the imager AF in which the focus lens 3A is scanned to search for the peak evaluated AF value while the evaluated AF value is acquired. The lens types are determined based on such consideration.

Specifically, it is assumed that the interchangeable lens having the focus lens driving time not less than the predetermined time at the whole shooting distance range of an infinitely far point to the closest point is the lens type 1 or 2 which is the lens suitable for the imager AF. Moreover, it is assumed that the interchangeable lens having the focus lens driving time not less than the predetermined time at the whole shooting distance range of the infinitely far point to the closest point is the lens type 0 as the lens which is not suitable for the imager AF.

Here, examples of the interchangeable lens which is the lens type 0 include a micro lens having a high shooting magnification of 1:1 macro or the like and a telephoto lens having a long focal length. Examples of the lens of the lens type 1 include a wide-angle lens having a short focal length. Examples of the lens of the lens type 2 include a standard lens having a medium focal length.

According to such classification of the lens type, in a case where, for example, the telephoto lens of the lens type 0 having the long focal length is used as the interchangeable lens 2, since the interchangeable lens is not suitable for the imager AF as described above, the focusing control is performed by the only phase-difference AF. In a case where, for example, the wide-angle lens of the lens type 1 having the short focal length is used as the interchangeable lens 2, when the focus lens is scanned over the whole shooting distance range by the imager AF, the driving can be completed in a sufficiently short time. Therefore, the focusing control is performed by the only highly precise imager AF. Furthermore, in a case where, for example, the standard lens of the lens type 2 having the intermediate focal length is used as the interchangeable lens 2, since a long time is required for the focusing control by the only imager AF as compared with the lens type 1, the coarse adjustment is performed by the phase-difference AF, and the fine adjustment is performed by the imager AF. In consequence, the time of the focusing control is compatible with the precision.

The focus detecting operation performed by the imager AF in the step S110 will hereinafter be described with reference to a flow chart of FIG. 10.

First, it is judged whether or not the in-range flag has been set in the step S130 (step S200). Here, in a case where it is judged that the in-range flag has been set, a scan region of the imager AF is set (step S201). Here, the scan region is set to ΔX before or after a current position of the focus lens 3A which is regarded as the center position. This ΔX is the scan region predetermined so as to perform a sufficiently highly precise focusing operation at a high speed. The range is stored in the storage section 5A of the interchangeable lens 2 and read out for use by the control section 16. It is to be noted that the above ΔX is appropriately changed with a parameter such as the focal length of the interchangeable lens 2, the position (a distance) of the focus lens 3A or high reliability of the phase difference detection.

In a case where it is judged in the step S200 that the in-range flag is not set, the scan region of the focus lens 3A is set to the whole focus lens movable region, that is, a region from the closest point to the infinitely far point (step S202). In the processing of this step S202, it is considered that there is a high possibility that the focus lens 3A is not positioned in the vicinity of the focus because the phase difference cannot reliably be detected or the phase-difference AF is not executed in advance.

After transmitting the scan region set in the step S201 or S202 in this manner to the lens control section 5 by the body and lens communication, a predetermined command is transmitted to the lens control section 5 to control the lens driving section 4 via the lens control section 5. In consequence, the focus lens 3A is moved to an end of the scan region on a side close to the camera body 1 (step S203).

Moreover, the lens driving command of the imager AF is transmitted to the lens control section 5 to start a scan operation of the focus lens 3A (step S204). Furthermore, the image processing section 13 exposes (EXP) the image pickup device 7 and reads out (READ) the image data at a predetermined timing after generation of the vertical sync signal VD. In addition, the evaluated AF value of the imager AF is calculated based on this read image data (step S205).

Subsequently, the processing waits until the vertical sync signal VD from the image processing section 13 rises (step S206). When the rising of the vertical sync signal VD is detected, the lens position of the focus lens 3A transmitted from the lens control section 5 is received (step S207). Moreover, the evaluated AF value acquired in the step S205 and the lens position of the focus lens 3A acquired in the step S207 are stored as the evaluated AF coordinate values in a storage section (not shown) (step S208). It is to be noted that such a relation between the lens position of the focus lens 3A and the evaluated AF value has been described above with reference to FIG. 3.

Subsequently, it is judged with reference to the evaluated AF coordinate value whether or not a focused point (the peak value of the evaluated AF value) has been passed (step S209). In a case where it is judged in this step S209 that the focused point (the peak value of the evaluated AF value) is not passed, it is judged whether or not the scan region set in the step S201 or S202 has all been scanned (step S210). In a case where it is judged in this step S210 that all the scan region has been scanned, a region to be scanned remains. Therefore, the processing returns to the step S205.

It is to be noted that in a loop of the steps S205 to S210, the focus lens 3A continues to be driven. When the processing of the steps S205 to S210 is repeated, the peak value of the imager AF can be searched.

In addition, in a case where it is judged in the step S209 that the focused point (the peak value of the evaluated AF value) is passed, a command to stop the driving of the focus lens 3A is transmitted to the lens control section 5 by the body and lens communication, and the driving of the focus lens 3A is stopped (step S211).

Subsequently, the lens position of the focus lens 3A at the time when the evaluated AF value reaches the peak value is obtained in detail by the interpolation with reference to the evaluated AF coordinate value. Moreover, the lens driving section 4 moves the focus lens 3A to a position where the evaluated AF value reaches the peak value via the lens control section 5 by the body and lens communication (step S212).

Subsequently, the peak value of the evaluated AF value is stored as a result of the imager AF in the storage section (not shown) (step S213) to end the processing of the imager AF. The processing returns to a main routine of the flow chart shown in FIG. 8. In addition, in a case where it is judged in the step S210 that all the scan region has been scanned, the focused point (the peak value of the evaluated AF value) is not obtained (branched from the step S209 to NO), and the processing in the scan region ends (branched from the step S210 to NO). Therefore, the focus lens 3A is moved to an initial position of the scan region (step S214). Moreover, the storage section (not shown) stores that the imager AF cannot be detected to end the processing. The processing returns to the main routine of the flow chart shown in FIG. 8.

The operation control of the interchangeable lens 2 by the lens control section 5 will hereinafter be described with reference to a flow chart shown in FIG. 11.

First, when the power source (not shown) of the camera body 1 is turned on, the lens power source is supplied to the interchangeable lens 2 via the lens contact section 8 from a camera body side. The lens power source is supplied to the interchangeable lens 2 to initialize each section of the interchangeable lens 2, and the lens control section 5 can be operated. Moreover, the processing waits until there is a request for the body and lens communication from the control section 16 (step S300). Here, when the demand for the body and lens communication is generated from the control section 16, the body and lens communication is performed, and a command transmitted from the control section 16 is received (step S301).

Next, it is judged whether or not the imager AF lens driving command (represented by an IAF lens driving command in FIG. 11) which is the lens driving command of the imager AF has been received (step S302). In a case where it is judged in this step S302 that the imager AF lens driving command has been received, the lens driving of the focus lens 3A is executed by the lens driving section 4 based on the imager AF lens driving command (step S309). It is to be noted that this step S309 corresponds to the step S204 (lens movement start) shown in FIG. 10.

After the lens driving is started in the step S309, the processing waits until the signal VDP output from the control section 16 to the lens control section 5 via the lens contact section 8 and synchronized with the vertical sync signal VD falls (step S310). Here, when it is detected that the signal VDP falls, output data of the encoder 15 indicating the lens position of the focus lens 3A is acquired (step S311). Moreover, the processing waits until the signal VDP rises (step S312). Here, when it is detected that the signal VDP rises, the lens position of the focus lens 3A acquired in the step S311 is transmitted to the control section 16 (step S313).

Subsequently, it is judged whether or not a lens stop command which is a command to stop the driving of the focus lens 3A has been received (step S314). In a case where it is judged in this step S314 that the lens stop command has been received, the lens driving section 4 stops the driving of the focus lens 3A (step S315). Moreover, the processing returns to the step S300. On the other hand, in a case where it is judged in the step S314 that the lens stop command is not received, the processing returns to the step S310. Subsequently, the processing of the steps S310 to S314 is repeated until it is judged in the step S314 that the lens stop command has been received.

In addition, in a case where it is judged in the step S302 that the imager AF lens driving command has not been received, it is judged whether or not the lens driving command of the TTL phase-difference AF has been received (step S303). In a case where it is judged in this step S303 that the lens driving command of the TTL phase-difference AF has been received, the lens driving section 4 drives the focus lens 3A based on the lens driving amount and the driving direction included in the lens driving command of the TTL phase-difference AF (step S306). When the lens driving of this step S306 ends, a lens driving end notice is transmitted to the control section 16 (step S307). Subsequently, the processing returns to the step S300.

On the other hand, in a case where it is judged in the step 303 that the lens driving command of the TTL phase-difference AF is not received, it is judged whether or not an initial communication command has been received (step S304). In a case where it is judged in this step S304 that the initial communication command has been received, initial body and lens communication is performed (step S308).

It is to be noted that during the body and lens communication performed in the step S308, the processing communicates with the control section 16 of the camera body 1 to perform initial setting of the interchangeable lens 2. Moreover, various data stored in the interchangeable lens 2 are transmitted to the control section 16.

It is to be noted that examples of the data stored in the interchangeable lens 2 include information such as the lens type, the focal length, the shootable distance, the total number of the focus pulses and the motor type and various corrected values concerning the AF. After ending the processing of the step S308, the processing returns to the step S300.

Moreover, in a case where it is judged in the step S304 that the initial communication command is not received, it is judged whether or not a command other than the above command has been received, and an operation is executed in response to the command (step S305).

Timings of operation control during the imager AF will hereinafter be described with reference to a timing chart shown in FIG. 12. It is to be noted that the processing of the step S110 (the imager AF) of the flow chart shown in FIG. 8 indicates a series of processing of the flow chart shown in FIG. 10.

Figure 10:
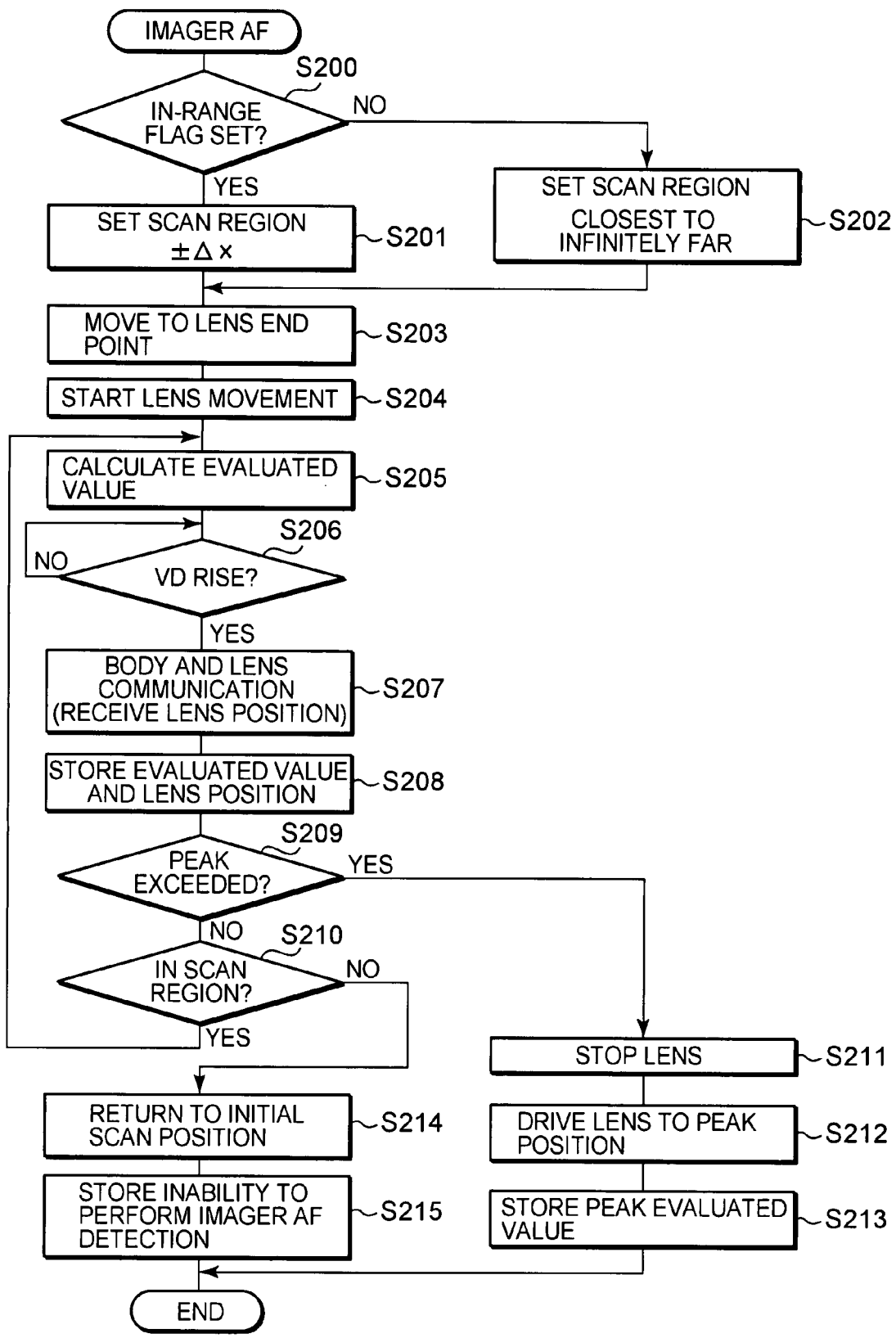
FIG. 10 is a flow chart showing operation control of imager AF performed by the control section of the digital camera according to the first embodiment of the present invention.

First, in the step S204 of the flow chart shown in FIG. 10, the control section 16 transmits the imager AF lens driving command to the lens control section 5. Moreover, the lens control section 5 receives the imager AF lens driving command. In the step S309 of the flow chart shown in FIG. 11, the lens driving section 4 starts the lens driving of the focus lens 3A.

On the other hand, the encoder 15 generates a signal pulse which is an encoder signal with the movement of the focus lens 3A. Moreover, the lens control section 5 counts the signal pulses to acquire the lens position of the focus lens 3A.

Figure 12:
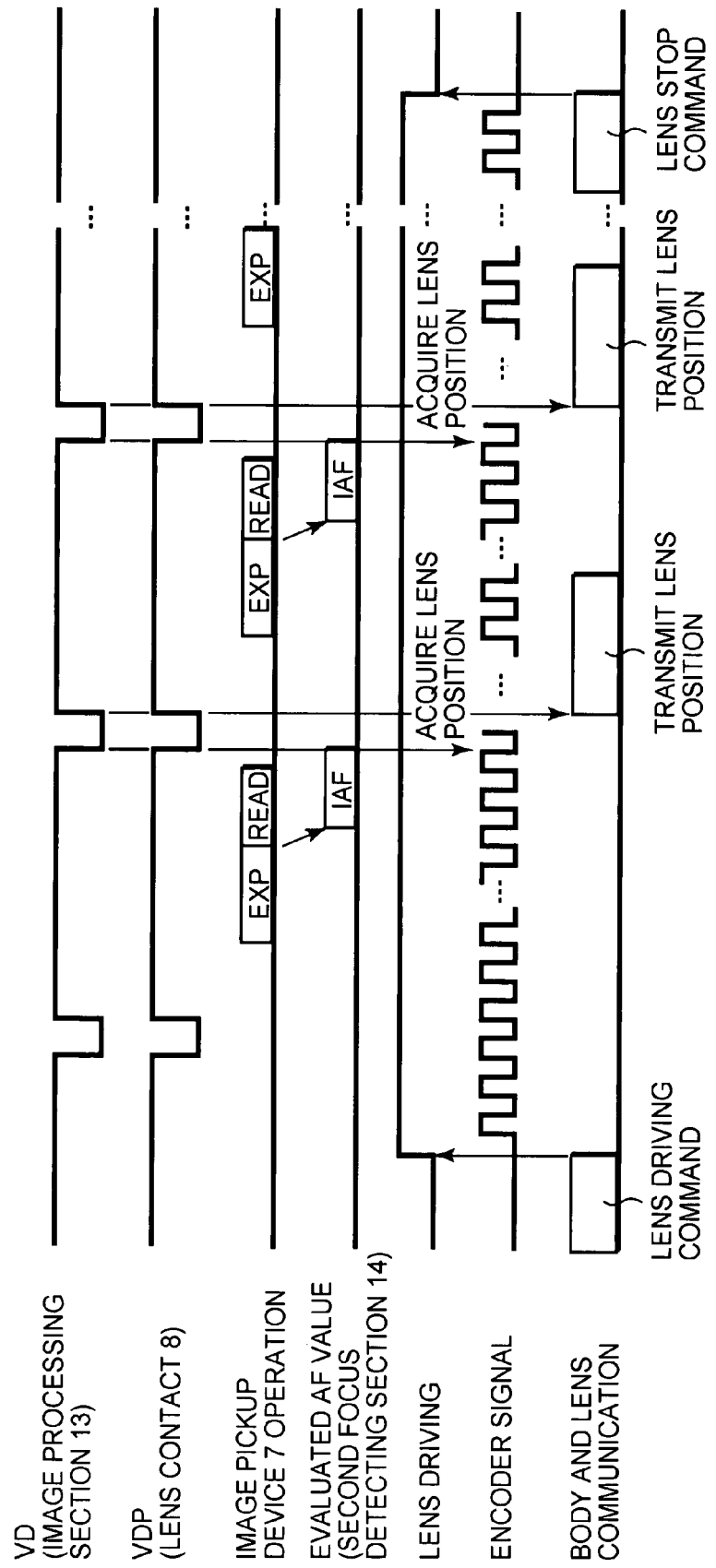
FIG. 12 is a timing chart showing a timing of the operation control performed by the imager AF.

It is to be noted that, as seen from the timing chart shown in FIG. 12, the control section 16 continuously drives the focus lens 3A. In the camera body 1, the imaging operation of the image pickup device 7 is performed at a predetermined timing of the vertical sync signal VD generated by the image processing section 13.

Moreover, when the exposure (EXP of the image pickup device 7 operation timing chart shown in FIG. 12) of the image pickup device 7 ends, the image data of the image pickup device 7 is read out by the image processing section 13 (READ of the image pickup device 7 timing chart shown in FIG. 12). In parallel with this readout operation, the image processing section 13 calculates the evaluated AF value (IAF) (the step S205 of the flow chart shown in FIG. 10). It is to be noted that the end timing of the calculation of the evaluated AF value is set beforehand so that the calculation ends before the vertical sync signal VD rises.

Figure 11:
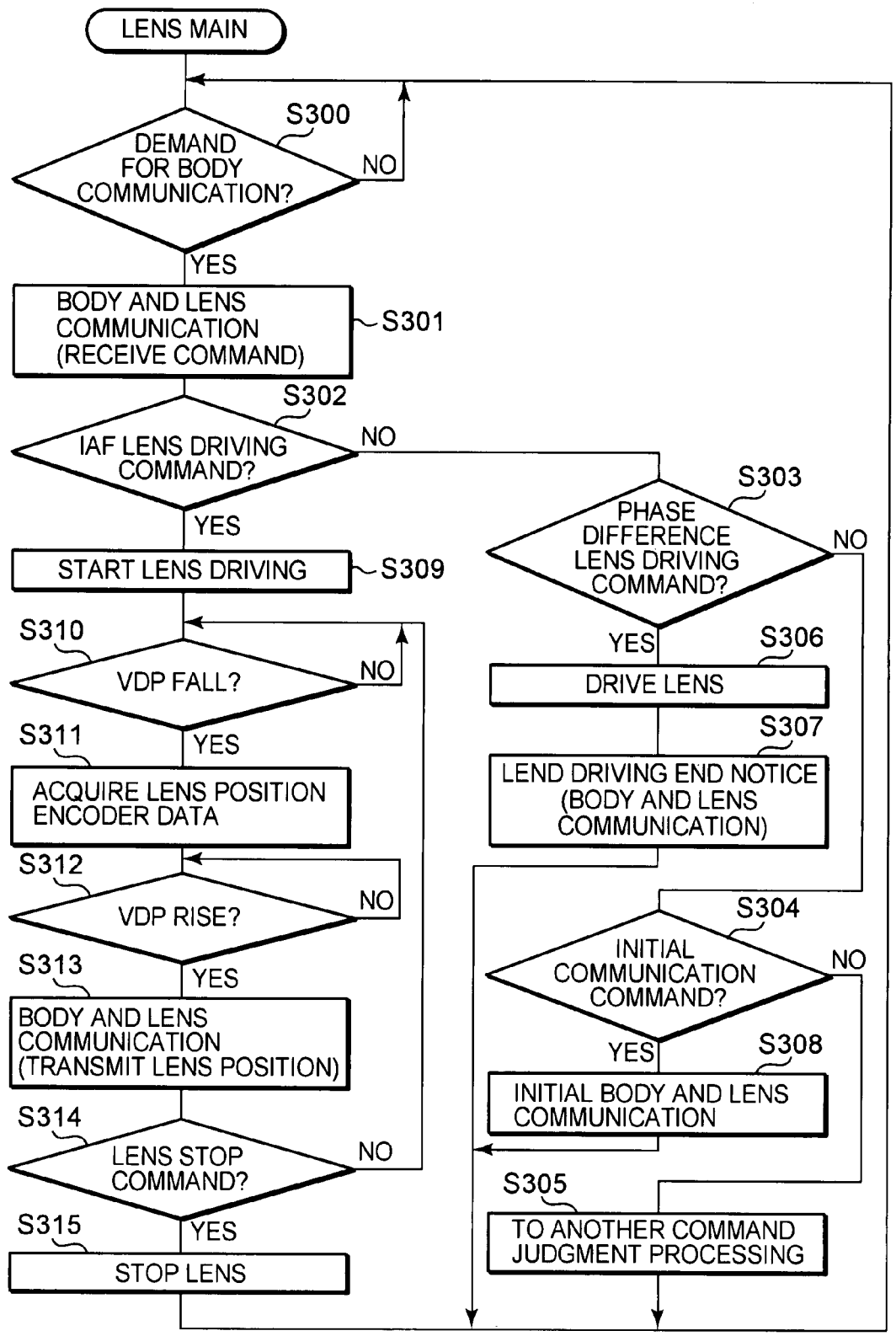
FIG. 11 is a flow chart showing operation control performed by a lens control section of the digital camera according to the first embodiment of the present invention.

Moreover, when the lens control section 5 waits until the signal VDP falls (the step S310 of the flow chart shown in FIG. 11) and detects the falling of the signal VDP, the section acquires the data of the lens position of the focus lens 3A from the pulse count output of the encoder 15 (FIG. 11: step S311).

Subsequently, when the lens control section 5 waits until the signal VDP (the vertical sync signal VD) rises (FIG. 11: step S312) and detects the rising of the signal VDP, the section transmits the data of the lens position of the focus lens 3A acquired as described above to the control section 16 (FIG. 11: step S313).

In other words, when the control section 16 waits until the vertical sync signal VD rises (FIG. 10: step S206) and detects the rising of the vertical sync signal VD, the section receives the lens position transmitted from the lens control section 5 (FIG. 10: step S207).

As described above, the control section 16 performs the body and lens communication with the lens control section 5 in synchronization with the rising of the vertical sync signal VD. In consequence, the data of the lens position of the focus lens 3A during the falling of the vertical sync signal VD can be acquired.

It is to be noted that a series of operations including the exposure operation of the image pickup device 7 to the transmission operation of the data of the lens position of the focus lens 3A to the control section 16 by the lens control section 5 are repeatedly executed during the driving of the photographing lens system 3 while the imager AF operation is performed.

Moreover, when the control section 16 transmits the lens stop command to the lens control section 5 by the body and lens communication, the lens control section 5 allows the lens driving section 4 to stop the driving of the focus lens 3A (FIG. 11: step S315).

As described above, according to the first embodiment, there can be provided the digital camera and the camera system capable of performing the highly precisely focusing control at the high speed regardless of optical characteristics of the interchangeable lens for use and a focus lens driving mechanism.

Specifically, lens type data such as whether or not the interchangeable lens 2 is suitable for the TTL phase-difference AF and/or the imager AF is stored beforehand in the interchangeable lens 2. Moreover, it is judged on a camera body 1 side based on the lens type data whether or not the interchangeable lens 2 for actual use is suitable for the TTL phase-difference AF and/or the imager AF. Here, in a case where it is judged that the interchangeable lens 2 for actual use is suitable for the TTL phase-difference AF, the focusing control is performed by the TTL phase-difference AF. In a case where it is judged that the interchangeable lens 2 for actual use is suitable for the imager AF, the focusing control is performed by the imager AF. Moreover, in a case where it is judged that the interchangeable lens 2 for actual use is suitable for both of the TTL phase-difference AF and the imager AF, the focusing control is coarsely adjusted by the TTL phase-difference AF system. Subsequently, the focusing control is finely adjusted by the imager AF. As described above, the optimum automatic focusing method is automatically selected in accordance with the optical characteristics of the interchangeable lens 2 for actual use and the focusing control mechanism to perform the focusing control. In consequence, the highly precisely focusing control can be performed at the high speed.

Second Embodiment

Next, a digital camera and a camera system according to a second embodiment of the present invention will be described. It is to be noted that only contents different from those of the digital camera and the camera system according to the first embodiment will be described.

Figure 13:
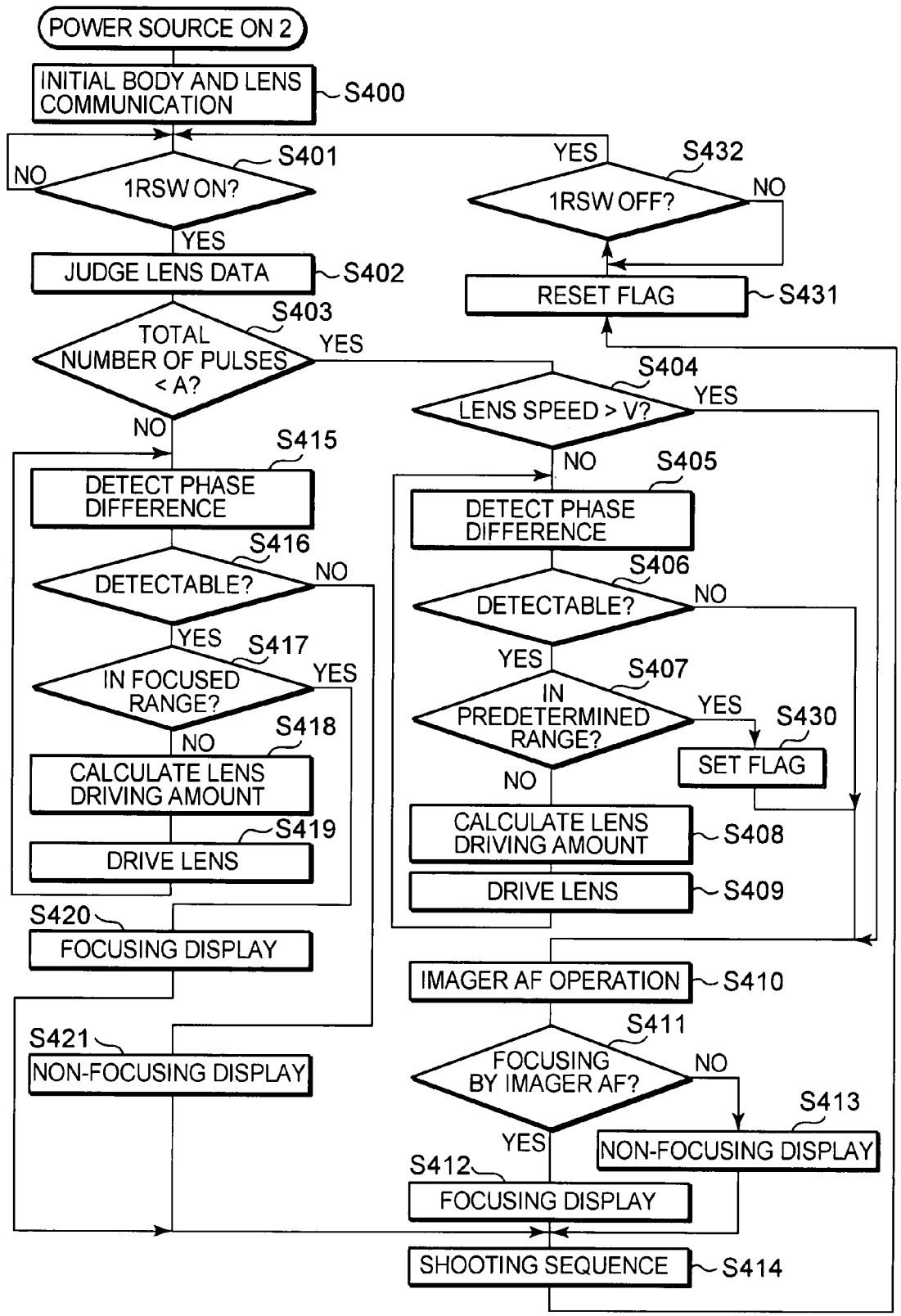
FIG. 13 is a flow chart showing the operation control performed by the control section of the digital camera according to a second embodiment of the present invention.

Operation control performed by a control section 16 of the digital camera according to the second embodiment will hereinafter be described with reference to a flow chart shown in FIG. 13.

First, when a user turns on a power source (not shown) disposed in a camera body 1, the control section 16 of the camera body 1 performs body and lens communication (step S400). That is, in this step S400, the control section 16 reads out various data stored in a storage section 5A of an interchangeable lens 2, and stores the data in a storage section (not shown) of the control section 16.

Moreover, examples of the data concerning the interchangeable lens 2 to be communicated during this body and lens communication include information such as the total number of focus pulses (hereinafter referred to as the total number of the lens pulses) corresponding to the whole shooting distance range of the interchangeable lens 2, a focus lens driving speed (hereinafter referred to as the lens speed), a focal length, a shootable distance and a driving motor type and various corrected values concerning AF. It is to be noted that in the second embodiment, the focus lens driving speed is grasped as the number of driving pulses per unit time.

After ending the body and lens communication in the step S400, the user half presses a release button to wait until a release switch 18 (1RSW) is turned on (step S401). Moreover, when the 1RSW is turned on, the step S401 is branched to YES to judge lens data of the interchangeable lens 2 based on the data acquired during the initial body and lens communication of the step S400 (step S402). Specifically, during the judgment of the lens data in this step S402, the lens data is judged based on data of the total number of the lens pulses and the lens speed, and the judgment result is stored in the storage section (not shown) disposed in the control section 16.

Subsequently, it is judged whether or not the total number of the lens pulses is smaller than a predetermined value A (step S403). In a case where it is judged in this step S403 that the total number of the lens pulses is smaller than the predetermined value A, it is judged whether or not the lens speed is larger than a predetermined value V (step S404). In a case where it is judged in this step S404 that the lens speed is not larger than the predetermined value V, processing of steps S405 to S414 and steps S430, S431 and S432 is performed. Here, the steps S405 to S414 are steps which perform processing similar to that of the steps S105 to S114 of the first embodiment. Moreover, the steps S430, S431 and S432 are steps which perform processing similar to that of the steps S130, S131 and S132 of the first embodiment. Furthermore, after ending the processing of the step S432, the processing returns to the step S401. In a case where it is judged in the step S404 that the lens speed is larger than the predetermined value V, the processing advances to the step S410. In addition, in a case where it is judged in the step S403 that the total number of the lens pulses is not smaller than the predetermined value A, processing of steps S415 to S421 is performed. Here, the steps S415 to S421 are steps which perform processing similar to that of the steps S115 to S121 of the first embodiment. Moreover, after ending the processing of the step S420 or S421, the processing shifts to a shooting sequence of the step S414.

As described above, in the digital camera and the camera system according to the second embodiment, in a case where the total number of the lens pulses is larger than the predetermined value A, only TTL phase-difference AF is executed. In a case where the total number of the lens pulses is smaller than the predetermined value A and the lens speed is larger than the predetermined value V, only imager AF is executed. Moreover, in a case where the total number of the lens pulses is smaller than the predetermined value A and the lens speed is smaller than the predetermined value V, focusing control is coarsely adjusted by the TTL phase-difference AF, and the focusing control is finely adjusted by imager AF.

As described above, according to the second embodiment, there can be provided a digital camera and a camera system which produce effects equivalent to those of the first embodiment.

That is, in the second embodiment, whether or not the interchangeable lens 2 is an interchangeable lens suitable for the TTL phase-difference AF or the imager AF is judged by use of parameters such as the total number of the lens pulses which is the total number of the focus pulses corresponding to the whole shooting distance range of the interchangeable lens 2 and the lens speed which is the focus lens driving speed. Here, in a case where it is judged that the interchangeable lens 2 is suitable for the TTL phase-difference AF, the focusing control is performed by the TTL phase-difference AF. In a case where it is judged that the interchangeable lens 2 is suitable for the imager AF, the focusing control is performed by the imager AF. Moreover, in a case where it is judged that the interchangeable lens 2 is suitable for both of the TTL phase-difference AF and the imager AF, the focusing control is coarsely adjusted by the TTL phase-difference AF system. Subsequently, the focusing control is finely adjusted by the imager AF. As described above, the optimum automatic focusing method is automatically selected in accordance with optical characteristics of the interchangeable lens 2 and a focusing control mechanism to perform the focusing control. In consequence, the highly precisely focusing control can be performed at the high speed.

Alternative Example

It is to be noted that instead of setting parameters such as the total number of lens pulses which is the total number of focus pulses corresponding the whole shooting distance range of a interchangeable lens 2 and a lens speed which is a movement speed of a focus lens 3A, needless to say, a numeric value (the total number of the lens pulses/the lens speed) obtained by dividing the total number of the lens pulses by the lens speed may be set as the parameter.

Here, the numeric value obtained by dividing the total number of the lens pulses by the lens speed is a parameter which is proportional to a lens driving time, that is, time required for focusing control. Therefore, even if the numeric value obtained by dividing this total number of the lens pulses by the lens speed is used, length of a focusing control time can be judged.

Third Embodiment

Next, a digital camera and a camera system according to a third embodiment of the present invention will be described. It is to be noted that only contents different from those of the first embodiment will be described.

Figure 14:
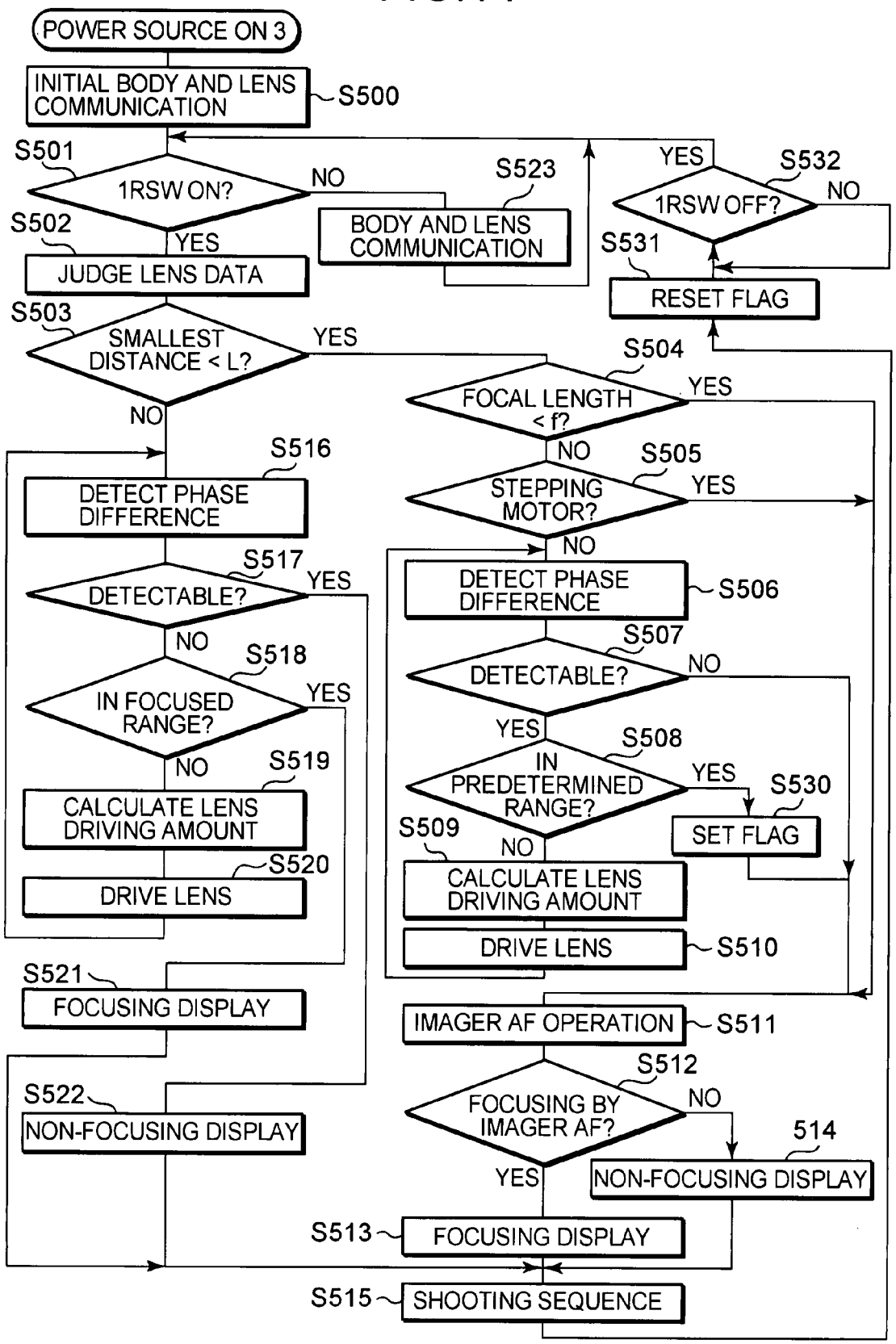
FIG. 14 is a flow chart showing the operation control performed by the control section of the digital camera according to a third embodiment of the present invention.

Operation control performed by a control section 16 of the digital camera according to the third embodiment will hereinafter be described with reference to a flow chart shown in FIG. 14.

First, when a user turns on a power source (not shown) disposed in a camera body 1, the control section 16 of the camera body 1 performs body and lens communication (step S500). That is, in this step S500, the control section 16 reads out various data stored in a storage section 5A of an interchangeable lens 2, and stores the data in a storage section (not shown) of the control section 16. Moreover, examples of the data concerning the interchangeable lens 2 to be communicated during this body and lens communication include information such as a shootable focal length corresponding to the whole shooting region of the interchangeable lens 2 and a driving motor type and various corrected values concerning AF.

After ending the body and lens communication in the step S500, the user half presses a release button to wait until a release switch 18 (1RSW) is turned on (step S501). Moreover, when the 1RSW is not turned on, the body and lens communication is performed to acquire a state of the interchangeable lens 2 (step S523), and the processing returns to the step S501. It is to be noted that, when the interchangeable lens 2 is, for example, an interchangeable lens of a zooming type, examples of the information of the interchangeable lens 2 acquired in the step S523 include a focal length value in a case zooming is performed to change a focal length. In a case where the interchangeable lens 2 is an interchangeable lens having a function capable of limiting a shootable distance range, the examples of the information include the smallest distance value in a case where the smallest distance is changed.

In addition, in a case where it is judged in the step S501 that the 1RSW has been turned on, the lens data of the interchangeable lens 2 is judged based on data acquired during the initial body and lens communication of the step S500 (step S502).

Specifically, during the lens data judgment of the step S502, the judgment is performed based on data of the smallest shootable distance of the interchangeable lens 2, the focal length and the type of the motor which drives a focus lens 3A. The judgment result is stored in the storage section (not shown) disposed in the control section 16.

After ending the data judgment processing of the step S502, it is judged whether or not the smallest shootable distance of the interchangeable lens 2 is smaller than a predetermined value L (step S503). In a case where it is judged in this step S503 that the smallest shootable distance of the interchangeable lens 2 is smaller than the predetermined value L, it is judged whether or not the focal length of the interchangeable lens 2 is smaller than a predetermined value f (step S504). In a case where it is judged in this step S504 that the focal length of the interchangeable lens 2 is smaller than the predetermined value f, the processing advances to step S511 described later.

On the other hand, in a case where it is judged in the step S504 that the focal length of the interchangeable lens 2 is not smaller than the predetermined value f, it is judged whether or not a driving source included in a lens driving section 4 is a stepping motor (step S505).

It is to be noted that driving source data for judgment of a driving source in the step S505 is set as shown in, for example, FIG. 15. That is, lens driving source data (0, 1 or 2) is data indicating that the driving source is a DC motor, a stepping motor or an ultrasonic motor.

In a case where it is judged in the step S505 that the driving source included in the lens driving section 4 is the stepping motor, the processing advances to the step S511 described later. On the other hand, in a case where it is judged in the step S505 that the driving source included in the lens driving section 4 is not the stepping motor, processing of steps S506 to S515 and steps S530, S531 and S532 is performed.

Here, the steps S506 to S515 are steps which perform processing similar to that of the steps S405 to S414 of the second embodiment. Moreover, the steps S530 to S532 are steps which perform processing similar to that of the steps S430 to S432 of the second embodiment.

In addition, in a case where it is judged in the step S503 that the smallest shootable distance of the interchangeable lens 2 is not smaller than the predetermined value L, processing of steps S516 to S522 is performed. Here, the steps S516 to S522 are steps which perform processing similar to that of the steps S115 to S121 of the first embodiment.

It is to be noted that in the step S521, focusing display indicating that a focused state is obtained is displayed in an LCD panel 10 by an image processing section 13. Subsequently, in the step S522, display indicating that the lens has a non-focused state is displayed in the LCD panel 10 by the image processing section 13. Subsequently, the processing shifts to a shooting sequence of the step S515.

As described above, in the digital camera and the camera system according to the third embodiment, in a case where the smallest shootable distance of the interchangeable lens 2 is larger than the predetermined value L, only TTL phase-difference AF is executed. In a case where the smallest shootable distance of the interchangeable lens 2 is smaller than the predetermined value L and the focal length is smaller than the predetermined value f, and in a case where the smallest shootable distance of the interchangeable lens 2 is smaller than the predetermined value L, the focal length is larger than the predetermined value f and the stepping motor is used as the driving source of the focus lens 3A, only imager AF is executed. Moreover, in a case where the smallest shootable distance of the interchangeable lens 2 is smaller than the predetermined value L, the focal length is larger than the predetermined value f and a motor other than the stepping motor is used as the driving source of the focus lens 3A, focusing control is coarsely adjusted by the TTL phase-difference AF, and the focusing control is finely adjusted by imager AF.

It is to be noted that even in a case where an interchangeable lens of such a zooming type that the focal length is variable as described above, an interchangeable lens of such a type that the smallest distance changes with the zooming or an interchangeable lens having a function capable of changing the shootable distance range is used as the interchangeable lens 2, the latest state of the interchangeable lens 2 is acquired in the step S523. Therefore, the focal length and the smallest distance during the AF are necessarily reflected in the judgment of the steps S503 and S504.

As described above, according to the third embodiment, there can be provided a digital camera and a camera system which produce effects equivalent to those of the first embodiment.

That is, in the third embodiment, whether or not the interchangeable lens 2 is an interchangeable lens suitable for the TTL phase-difference AF or the imager AF is judged by use of parameters such as the smallest shootable distance of the interchangeable lens 2, the focal length and the type of the driving motor of the focus lens 3A.

Here, in a case where it is judged that the interchangeable lens 2 is suitable for the TTL phase-difference AF, the focusing control is performed by the TTL phase-difference AF. In a case where it is judged that the interchangeable lens 2 is suitable for the imager AF, the focusing control is performed by the imager AF. Moreover, in a case where it is judged that the interchangeable lens 2 is suitable for both of the TTL phase-difference AF and the imager AF, the focusing control is coarsely adjusted by the TTL phase-difference AF system. Subsequently, the focusing control is finely adjusted by the imager AF. As described above, the optimum automatic focusing method is automatically selected in accordance with optical characteristics of the interchangeable lens 2 and a focusing control mechanism to perform the focusing control. In consequence, the highly precisely focusing control can be performed at the high speed.

It is to be noted that even if a shooting magnification is used as the judgment parameter instead of the smallest shootable distance of the interchangeable lens 2, needless to say, a similar effect is obtained.

Fourth Embodiment

Next, a digital camera and a camera system according to a fourth embodiment of the present invention will be described. It is to be noted that only contents different from those of the first embodiment will be described.

Figure 16:
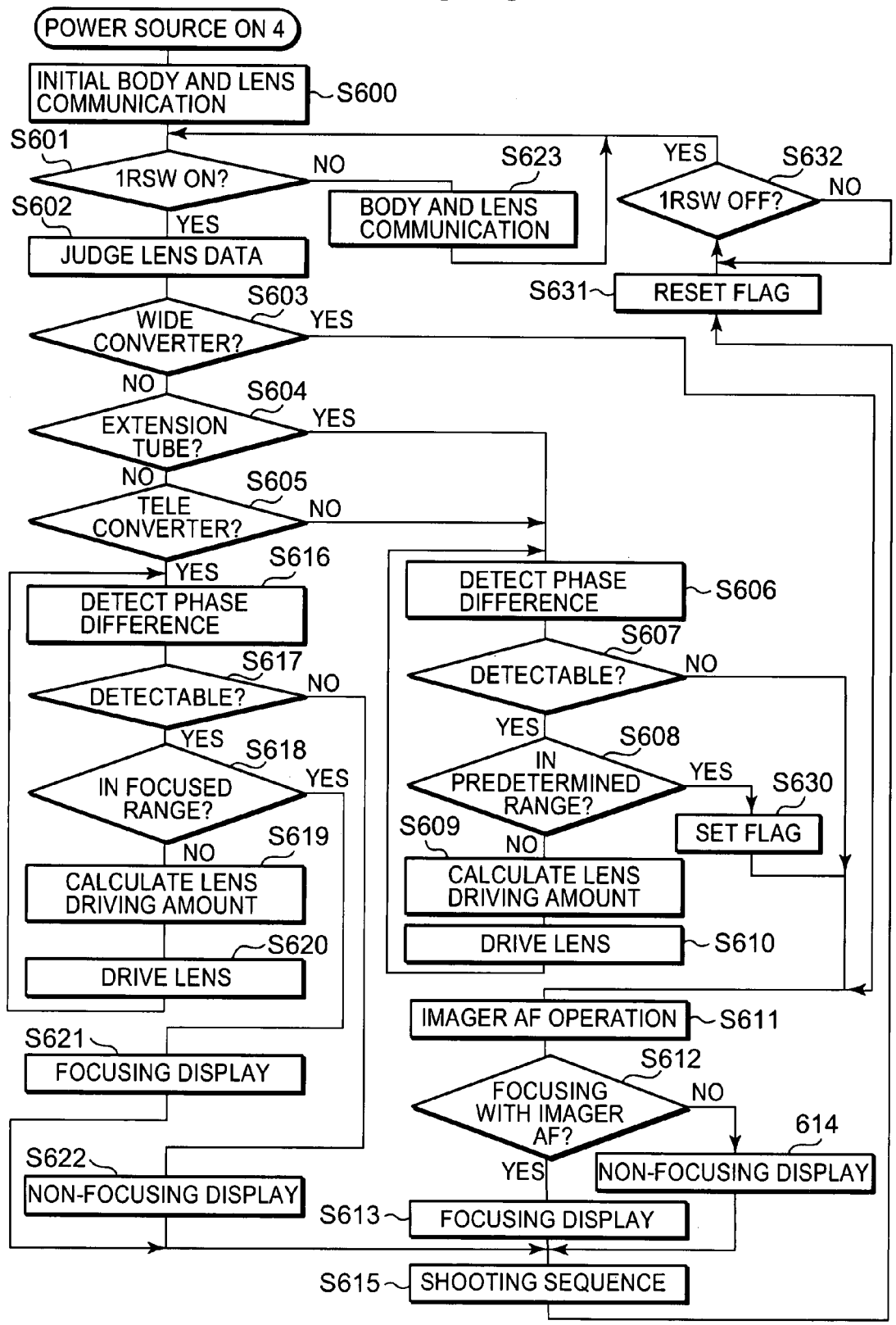
FIG. 16 is a flow chart showing the operation control performed by the control section of the digital camera according to a fourth embodiment of the present invention.

Operation control performed by a control section 16 of the digital camera according to the fourth embodiment will hereinafter be described with reference to a flow chart shown in FIG. 16.

First, when a user turns on a power source (not shown) disposed in a camera body 1, the control section 16 of the camera body 1 performs body and lens communication (step S600). That is, in this step S600, the control section 16 reads out various data stored in a storage section 5A of an interchangeable lens 2, and stores the data in a storage section (not shown) of the control section 16.

It is to be noted that examples of the data concerning the interchangeable lens 2 to be communicated during this body and lens communication include information indicating whether or not an accessory such as a telephoto converter, a wide converter or a extension tube (a close-up ring) is attached to the interchangeable lens 2. The attachment of this accessory can be detected with an electric contact disposed at, for example, the interchangeable lens 2. This attachment information can be stored in the storage section 5A of the interchangeable lens 2. Based on this attachment information, the control section 16 as a judgment section of the camera body 1 judges the accessory which is attached to the interchangeable lens.

After ending the body and lens communication in the step S600, the user half presses a release button to wait until a release switch 18 (1RSW) is turned on (step S601). Here, when the 1RSW is not turned on, the body and lens communication is performed to acquire information of the interchangeable lens 2 (step S623), and the processing returns to the step S601.

It is to be noted that, when the interchangeable lens 2 is, for example, an interchangeable lens of a zooming type, examples of the information of the interchangeable lens 2 acquired in the step S623 include a focal length value in a case zooming is performed to change a focal length. In a case where the interchangeable lens 2 is an interchangeable lens having a function capable of limiting a shootable distance range, the examples of the information include the smallest distance value in a case where the smallest distance is changed.

Moreover, in a case where it is judged in the step S601 that the 1RSW has been turned on, lens data of the interchangeable lens 2 is judged based on data acquired during the initial body and lens communication of the step S600 (step S602).

Specifically, during the lens data judgment of the step S602, it is judged whether or not an accessory such as the telephoto converter, the wide converter or the extension tube (the close-up ring) is attached to the interchangeable lens 2. The judgment result is stored in a storage section disposed in the control section 16.

After ending the lens data judgment processing of the step S602, it is judged whether or not the wide converter is attached to the interchangeable lens 2 (step S603). In a case where it is judged in this step S603 that the wide converter is attached to the interchangeable lens 2, the processing advances to step S611 described later.

In a case where it is judged in the step S603 that the wide converter is not attached to the interchangeable lens 2, it is judged whether or not the extension tube is attached to the interchangeable lens 2 (step S604). In a case where it is judged in this step S604 that the extension tube is attached to the interchangeable lens 2, the processing advances to step S606 described later.

In a case where it is judged in the step S604 that the extension tube is not attached to the interchangeable lens 2, it is judged whether or not the telephoto converter is attached to the interchangeable lens 2 (step S605). In a case where it is judged in this step S605 that the telephoto converter is not attached to the interchangeable lens 2, the processing advances to the step S606 described later.

In a case where it is judged in the step S605 that the telephoto converter is attached to the interchangeable lens 2, processing of steps S616 to S622 is performed. Here, the steps S616 to S622 are steps which perform processing similar to that of the steps S115 to S121 of the first embodiment.

It is to be noted that in the step S621, focusing display indicating that a focused state is obtained is displayed in an LCD panel 10 by an image processing section 13. Subsequently, in the step S622, display indicating that the lens has a non-focused state is displayed in the LCD panel 10 by the image processing section 13. Subsequently, the processing shifts to a shooting sequence of step S615 which performs processing similar to that of the step S515.

In addition, in a case where it is judged in the step S604 that the extension tube is attached to the interchangeable lens 2 and it is judged in the step S605 that the telephoto converter is not attached to the interchangeable lens 2, processing of steps S606 to S615 and steps S630 to S632 is performed. Here, the steps S606 to S615 are steps which perform processing similar to that of the steps S105 to S114 of the first embodiment. The steps S630 to S632 are steps which perform processing similar to that of the steps S130 to S132, respectively. After ending the processing of the step S632, the processing returns to the step S601.

It is to be noted that in a case where it is judged in the step S603 that the wide converter is attached to the interchangeable lens 2, the processing advances to the step S611 which performs processing similar to that of the step S110 of the first embodiment to execute imager AF. Specific processing contents during this imager AF have been described in detail with reference to the flow chart shown in FIG. 10.

As described above, in the digital camera and the camera system according to the fourth embodiment, when the wide converter is attached to the interchangeable lens 2, the only imager AF is executed. When the wide converter is attached to the interchangeable lens 2, the focal length of the interchangeable lens 2 is converted into a shorter focal length. Therefore, a focusing control time does not change, a subject depth increases, and focusing control precision changes to be high. Therefore, it is more appropriate to use the imager AF which is more highly precise than TTL phase-difference AF. When the telephoto converter is attached to the interchangeable lens 2, the only TTL phase-difference AF is executed. Since the focal length of the interchangeable lens 2 is converted into a longer focal length, an evaluated AF value (contrast) less changes with respect to a change of a predetermined defocus amount. This is disadvantageous for the imager AF. Moreover, in a case where the extension tube is attached to the interchangeable lens 2, after coarsely adjusting focusing control by the TTL phase-difference AF, the focusing control is finely adjusted by the imager AF. This is because, when the extension tube is attached to the interchangeable lens 2, a relation between the defocus amount and a lens movement amount changes, the precision of the focusing control by the TTL phase-difference AF drops, and time required for focusing lengthens. Therefore, in such a case, the TTL phase-difference AF is used during the only coarse adjustment. Subsequently, the fine adjustment is performed by the imager AF in which any precision drop is not generated.

As described above, according to the fourth embodiment, there can be provided a digital camera and a camera system which produce effects equivalent to those of the first embodiment.

That is, in the fourth embodiment, whether or not the interchangeable lens 2 has a state suitable for the TTL phase-difference AF or the imager AF is judged by use of parameters such as whether or not an accessory such as the wide converter, the extension tube or the telephoto converter is attached to the interchangeable lens 2. Here, in a case where it is judged that the interchangeable lens 2 is suitable for the TTL phase-difference AF, the focusing control is performed by the TTL phase-difference AF. In a case where it is judged that the interchangeable lens 2 is suitable for the imager AF, the focusing control is performed by the imager AF. Moreover, in a case where it is judged that the interchangeable lens 2 is suitable for both of the TTL phase-difference AF and the imager AF, the focusing control is coarsely adjusted by the TTL phase-difference AF system. Subsequently, the focusing control is finely adjusted by the imager AF. As described above, the optimum automatic focusing method is automatically selected in accordance with optical characteristics of the interchangeable lens 2 and a focusing control mechanism to perform the focusing control. In consequence, the highly precisely focusing control can be performed at the high speed.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera to which a lens unit having a focus lens is detachably attached, the digital camera comprising:
   an imaging section having an image pickup device to convert an optical image of a subject irradiated via the lens unit into an electrical signal;
   a first focus detecting section which detects focal information of the focus lens by a phase difference-based method;
   a second focus detecting section which detects focal information of the focus lens by a contrast-based method;
   a control section which selects the focal information detected by one of the first focus detecting section and the second focus detecting section and which generates a focusing control signal to control a focal position of the focus lens based on the selected focal information; and
   a transmitting and receiving section which transmits the focusing control signal to the lens unit and which receives information about a characteristic of the lens unit transmitted from the lens unit,
   wherein the control section determines, based on the information on the lens unit acquired via the transmitting and receiving section, whether or not the second focus detecting section is suitable for use with the lens unit, and
   wherein, when the control section determines that the second focus detecting section is suitable for use with the lens unit, the control section sets the second focus section to be operated without using the first focus detecting section.

2. The digital camera according to claim 1, wherein the information on the lens unit includes flag information which indicates whether or not at least one of the first focus detecting section and second focus detecting section is suitable for the lens unit.

3. The digital camera according to claim 1, wherein the lens unit includes a focus driving section which moves the focus lens, and wherein the information on the lens unit includes information indicating a system of focusing control related to the lens unit or information indicating a type of a member which moves the focus lens.

4. The digital camera according to claim 1, wherein the information on the lens unit includes information indicating a focal length or a shootable distance of the lens unit.

5. The digital camera according to claim 1, wherein the information on the lens unit includes information indicating a movable range of the focus lens of the lens unit.

6. The digital camera according to claim 1, wherein the information on the lens unit includes information indicating a movement speed of the focus lens.

7. The digital camera according to claim 1, wherein the control section further has a judgment section which judges whether or not a conversion lens or a extension tube is attached to the lens unit, and
   wherein the control section performs the selection based on a judgment result obtained by the judgment section.

8. A camera system comprising: a camera main body; and a lens unit detachably attached to the camera main body,
   the lens unit including:
      a focus lens;
      a focus driving section which moves the focus lens; and
      a storage section in which information about the lens unit is stored; and
      a communication section which communicates with the camera main body,
   the camera main body including:
      an imaging section having an image pickup device to convert an optical image of a subject irradiated via the lens unit into an electrical signal;
      a first focus detecting section which detects focal information of the focus lens by a phase difference-based method;

a second focus detecting section which detects focal information of the focus lens by a contrast-based method;

a control section which selects the focal information detected by one of the first focus detecting section and the second focus detecting section and which generates a focusing control signal to control a focal position of the focus lens based on the selected focal information; and a transmitting and receiving section which receives information about a characteristic of the lens unit transmitted from the lens unit via the communication section and which transmits the focusing control signal to the lens unit, wherein the control section determines, based on the information on the lens unit acquired via the transmitting and receiving section, whether or not the second focus detecting section is suitable for use with the lens unit, and wherein, when the control section determines that the second focus detecting section is suitable for use with the lens unit, the control section sets the second focus section to be operated without using the first focus detecting section.

9. The camera system according to claim 8, wherein the information about a characteristic of the lens unit stored in the storage section includes at least one of (A) information indicating a system of focusing control related to the lens unit, (B) flag information which indicates whether or not at least one of the first focus detecting section and second focus detecting section is suitable for use with the lens unit, (C) information indicating a type of a member which moves the focus lens, (D) information indicating a focal length of the focus lens, (E) information indicating a shootable distance of the lens unit, (F) information indicating a movable range of the focus lens of the lens unit and (G) information indicating a movement speed of the focus lens.

10. A focusing control method, for use with a digital camera attached to a detachable lens unit, to focus the detachable lens unit, the method comprising:

performing communication between a main body of the digital camera and the lens unit to provide information about a characteristic of the lens unit to the main body of the digital camera from the lens unit;

determining, based on the information on the lens unit in the digital camera, whether or not image:

autofocus is suitable for the lens unit instead of TTL phase-difference autofocus; and as a result of the selection, determination, setting the imager autofocus to be operated without using the TTL phase-difference autofocus.

* * * * *